United States Patent
Feng et al.

(10) Patent No.: US 9,335,816 B2
(45) Date of Patent: May 10, 2016

(54) SYSTEM AND METHOD FOR EFFICIENT SERVICE-INSTANCE ORIENTED ENERGY MANAGEMENT IN THE INTERNET OF THINGS

(71) Applicant: GLOBALFOUNDRIES INC., Grand Cayman (KY)

(72) Inventors: Zhen Tan Feng, Beijing (CN); Chi Liu, Beijing (CN); Zhanwei Sun, Beijing (CN); Bo Yang, Beijing (CN); Qi Yu, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 62 days.

(21) Appl. No.: 14/363,465

(22) PCT Filed: Oct. 31, 2012

(86) PCT No.: PCT/CN2012/083807
§ 371 (c)(1),
(2) Date: Jun. 6, 2014

(87) PCT Pub. No.: WO2013/091442
PCT Pub. Date: Jun. 27, 2013

(65) Prior Publication Data
US 2014/0331073 A1    Nov. 6, 2014

(30) Foreign Application Priority Data

Dec. 23, 2011    (CN) .......................... 2011 1 0456813

(51) Int. Cl.
| | |
|---|---|
| *G06F 1/32* | (2006.01) |
| *H04W 52/02* | (2009.01) |
| *H04L 12/26* | (2006.01) |

(52) U.S. Cl.
CPC ................ *G06F 1/329* (2013.01); *H04L 43/08* (2013.01); *H04W 52/0216* (2013.01); *H04W 52/0219* (2013.01); *Y02B 60/50* (2013.01)

(58) Field of Classification Search
CPC ............. G06F 1/329; H04W 52/0216; H04W 52/0219

USPC .......................................................... 713/340
See application file for complete search history.

(56) References Cited

U.S. PATENT DOCUMENTS

| | | | |
|---|---|---|---|
| 7,877,168 B1 | 1/2011 | Porter | |
| 2005/0122233 A1* | 6/2005 | Isoyama | ................ H04Q 9/00 340/870.11 |

(Continued)

FOREIGN PATENT DOCUMENTS

| | | |
|---|---|---|
| CN | 101815326 B | 6/2011 |
| CN | 102143526 A | 8/2011 |

(Continued)

OTHER PUBLICATIONS

R. Urgaonkar et al., "Quality of Information Aware Scheduling in Task processing Networks" International Symposium on Modeling and Optimizating in Mobile, 2011 p. 401-406, NJ.

*Primary Examiner* — Vincent Tran
(74) *Attorney, Agent, or Firm* — Scully Scott Murphy and Presser

(57) ABSTRACT

A system and a method for efficient service-instance oriented energy management in the IoT are provided. The method comprises: a predicting step for predicting target service instances to be serviced in a subsequent time period based on a service instance stance transition model; a selecting step for selecting an ON-sensor set to be turned on to provide services on which said target service instances are based, according to a critical covering set corresponding to the target service instances, the use history data of sensors in the critical covering set and energy parameters of said sensors; a controlling step for performing, when said time period begins, an ON/OFF control on the sensors in the IoT so that the sensors in the ON-sensor set are turned on and the sensors other than those in the ON-sensor set are turned off; and an updating step for updating the use history data of sensors according to the usage of sensors in said time period.

20 Claims, 11 Drawing Sheets

(56) References Cited

U.S. PATENT DOCUMENTS

| | | |
|---|---|---|
| 2007/0233285 A1 | 10/2007 | Yamamoto |
| 2010/0161778 A1* | 6/2010 | Guinard .............. G06F 9/5044 709/222 |
| 2011/0128910 A1* | 6/2011 | Moriwaki ........... H04L 41/0654 370/328 |
| 2011/0293278 A1 | 12/2011 | Mazed |
| 2013/0039230 A1* | 2/2013 | Lee .................. H04W 52/0219 370/280 |
| 2013/0182615 A1* | 7/2013 | Sun .................. H04W 52/0219 370/255 |

FOREIGN PATENT DOCUMENTS

| | | |
|---|---|---|
| CN | 102215256 A | 10/2011 |
| CN | 202077194 U | 12/2011 |
| JP | 2002278604 | 9/2002 |
| JP | 2004213336 | 7/2004 |
| JP | 2005065148 | 3/2005 |
| JP | 2005110288 | 4/2005 |
| WO | 2006030742 A1 | 2/2006 |

* cited by examiner

Application1

Application2

Application3

SYSTEM AND METHOD FOR EFFICIENT SERVICE-INSTANCE ORIENTED ENERGY MANAGEMENT IN THE INTERNET OF THINGS

CROSS-REFERENCE TO RELATED APPLICATIONS

This application claims priority under 35 U.S.C. §371 from PCT Application, PCT/CN2012/083807, filed on Oct. 31, 2012, which claims priority from Chinese Patent Application No. 201110456813.8, filed on Dec. 23, 2011. The entire contents of both applications are incorporated herein by reference.

TECHNICAL FIELD

The present invention relates to a field of Internet of Things (IoT). More specifically, the present invention relates to a system and a method for efficient service-instance oriented energy management in the IoT.

DESCRIPTION OF THE RELATED ART

The IoT is an important component of the new generation information technology, and its full name is "The Internet of Things". Thus, the IoT is the Internet over which things are connected with each other, as its name implies. Specifically, the IoT is a huge network formed in combination with the Internet, in which through various information sensor apparatuses such as sensor, Radio Frequency Identification (RFID) technology, Global Positioning System, infrared sensor, laser scanner, gas sensor or the like, any object or process requiring monitoring, connecting, interacting with is acquired in real time, and various necessary information such as its sound, light, heat, electricity, mechanics, chemistry, biology, position, etc. is acquired. The purpose of the IoT is to achieve connections between things and things, things and human beings, all things and networks, to facilitate recognition, management and control.

Most of the IoT access networks are wireless. In some cases, sensors for acquiring various information may even be deployed in the field. In this case, a sensor is powered by its battery, so its power capacity is limited, and these sensors seldom move. When a sensor runs out its power, it may be not practical to replace battery of this sensor manually in the wild field (e.g., for a case where the sensor is deployed in a sounding balloon, or on sea floor, or in volcanic crater). Moreover, in a case where sensors are very cheap, it is rather troublesome to find sensors deployed in the wild field for replacing their batteries. So, how to keep the energy of the entire IoT network to make it work for a longer time becomes a great challenge.

FIG. 2 is a diagram illustrating the deployment position of an IoT energy management server which is adapted to implement the present invention, in the IoT. In the prior art, there is an application deployed in the layer of access network for performing energy management on sensors in a single domain. However, there are limitations on management in this level. For example, taking a service that provides an average temperature of the Beijing city as an example, it is assumed that the average temperature provided by the service is based on an average value of sensing values of a temperature sensor a physically located in a domain A in the north of the Beijing city and a temperature sensor b physically located in a domain B in the south of the Beijing city. When energy management is performed on sensors in accordance with the level of access network, since energy management patterns may be different between different domains and the management is usually irrelevant, the following case becomes possible: the power of the temperature sensor a remains a lot, while the power of the temperature sensor b is used out. So the temperature in the south of the Beijing city can not be acquired, and it is impossible to continue providing the service regarding the average temperature of the Beijing city, which leads to a low Quality of Service (QoS).

The prior arts include, for example, IEEE 802.11 Power Save Mode (PSM). This technology reduces a device's idle listening time by periodically entering it into the sleep state, thereby causing the device to save power.

In addition, in the well known Sensor-MAC (S-MAC) protocol, nodes in the network periodically sleep, and neighbors form virtual clusters to auto-synchronize on sleep schedules.

All the above prior arts are designed for a specific network domain or network protocol, and do not support flexible combination of provided service capabilities.

SUMMARY OF THE INVENTION

Based on the above description, it is desirable to provide a method and a system capable of efficiently scheduling ON/OFF states of sensors in the context of the IoT so as to save power to a considerable extent in the long term while satisfying the QoS requirements.

In order to solve the above technical problems, the inventors of the present invention have proposed that energy management should be performed in terms of service instances, but not directly in terms of sensors. According to one aspect of the present invention, there is provided a service-instance oriented energy management method in the IoT, comprising: predicting target service instances to be serviced in a subsequent time period, based on a service instance transition model; selecting an ON-sensor set to be turned on to provide services on which said target service instances are based, according to a critical covering set corresponding to the target service instances, the use history data of sensors in the critical covering set and energy parameters of said sensors; and in response to start of said time period, performing an ON/OFF control on the sensors in the IoT so that the sensors in the ON-sensor set are turned on and the sensors other than those in the ON-sensor set are turned off.

According to another aspect of the present invention, there is provided a service-instance oriented energy management system in the IoT, comprising: a prediction means configured to predict target service instances to be serviced in a subsequent time period, based on a service instance transition model; a selection means configured to select an ON-sensor set to be turned on to provide services on which said target service instances are based, according to a critical covering set corresponding to the target service instances, the use history data of sensors in the critical covering set and energy parameters of said sensors; and a control means configured to perform, in response to start of said time period, an ON/OFF control on the sensors in the IoT so that the sensors in the ON-sensor set are turned on and the sensors other than those in the ON-sensor set are turned off.

The method and the system of the present invention are not dependent on any MAC layer protocols, and they are transparent to lower layer communication protocols, and are compatible with any MAC layer protocols. The method and the system of the present invention support flexible combination of provided service capabilities. In addition, the method and the system of the present invention can consider dynamic changes in running the application.

BRIEF DESCRIPTION OF THE DRAWINGS

The present invention itself and embodiments, other objects and advantages thereof will be better understood by reading the following detailed description of illustrative embodiments with reference to drawings in which.

Figure 1:
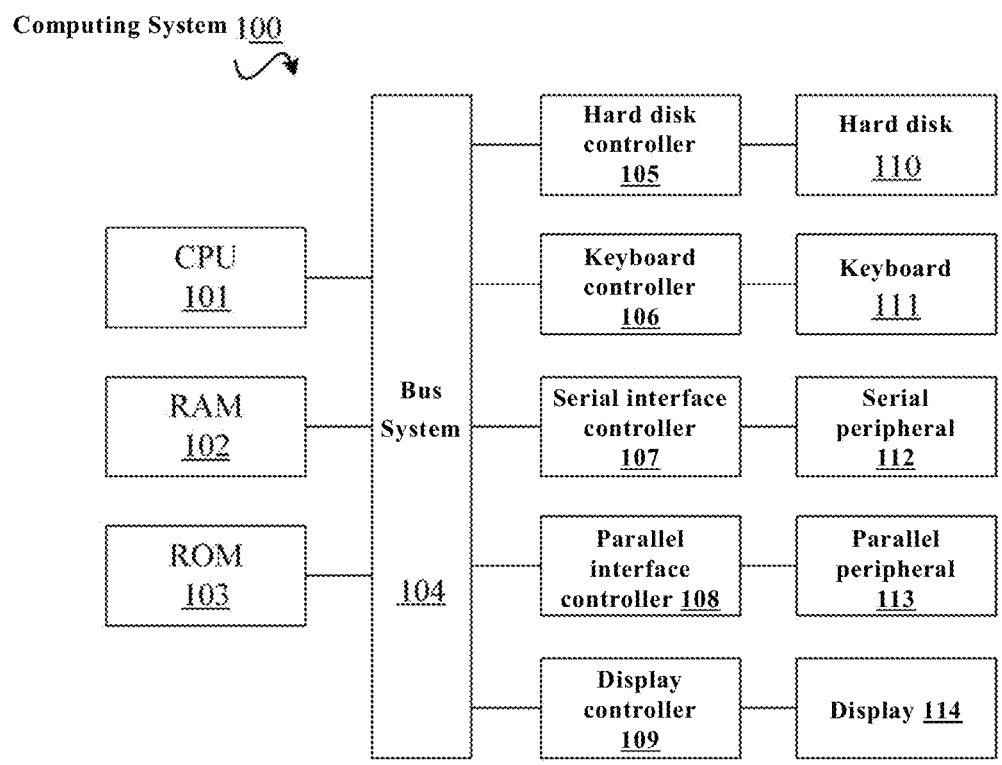
FIG. 1 illustrates a block diagram of an exemplary computing system 100 which is adapted to implementing an embodiment of the present invention.

Now, preferred methods and systems are described with reference to drawings wherein the same reference numbers are used to indicate the same elements in the drawings. In the following description, for an explanatory purpose, many specific details are set forth in order to help fully understand systems and methods, etc. In other examples, in order to simplify the description, commonly used structures and devices are illustrated in a form of block diagram. Many modifications and other embodiments may be conceived of by those skilled in the art, which own the benefits taught in the specification and drawings as well. Therefore, it should be understood that the present invention is not limited to the disclosed specific embodiments, and additional possible embodiments should be contained in the scope and exemplary inventive concept of the present invention. Although some specific terms are used herein, they are simply used in a general descriptive sense but not for a limiting purpose.

DETAILED DESCRIPTION OF THE PREFERRED EMBODIMENT

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

In the following explanation, firstly, key terms and concepts used in this disclosure are described.

Different sensors in the IoT provide different sensing capabilities. For example, a temperature sensor may sense the temperature, and a humidity sensor may sense the humidity, etc. In the present invention, these sensing capabilities are packaged into many different services to be provided to applications. A service in the present invention refers to the basic service that can be provided to an application, such as "temperature in 3rd-Floor Room 301"and "humidity in 3rd-Floor Room 301". That is, the service in the present invention is the basic granularity providing a specific IoT sensing service. An application is only required to combine different services to implement a particular application scenario.

Figure 2:
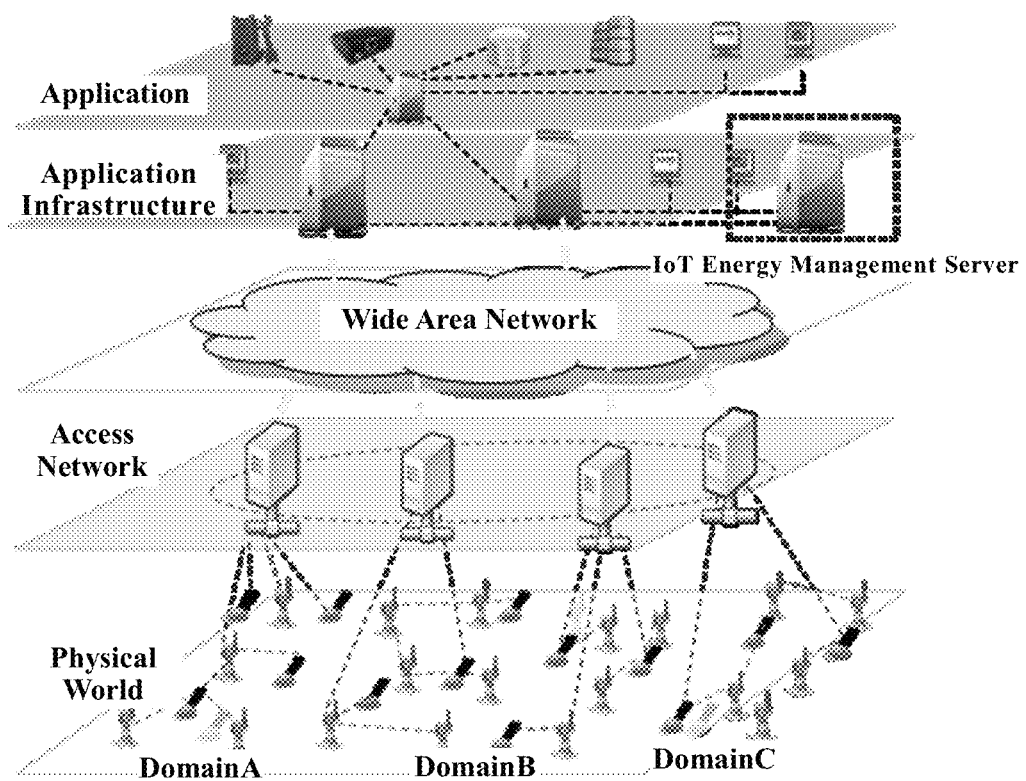
FIG. 2 is a diagram illustrating the deployment position of an IoT energy management server which is adapted to implementing the present invention, in the IoT.

The method and the system according to the present invention are implemented in the application infrastructure layer of the IoT (see FIG. 2). For example, they are implemented in the IoT energy management server in FIG. 2. The IoT energy management server is used to control the duty cycle of a physical sensor to keep the whole system the most energy-efficient. The IoT application infrastructure is a distributed middleware platform to support the execution of IoT applications. The application infrastructure platform provides the capabilities of managing physical sensors as services. For example, both of "temperature in 3rd-Floor Room 301"and "humidity in 3rd-Floor Room 301"are examples of services achieved by the application infrastructure. With flexible combination of various services achieved by the application infrastructure, IoT applications may form their application logic suitable for various practical scenarios. Each service may require the involvement of physical sensors from different network domains, such as the above example of the average temperature of the Beijing city.

For each service, its runtime instance is defined as a service instance (SI). A service instance is an instance of a service that can be provided based on a combination of sensors. When an application actually uses (invokes) a service, the service instance of the service is generated and run in the IoT, and the running requires corresponding sensors to work. Energy management performed by the method and the system according to the present invention is based on service instances instead of sensors. In doing so, there are the following advantages:

1. For services, each service instance may be accomplished by a different combination of sensors, and particulars of sensor apparatuses management are screened for applications, thereby enhancing flexibility of the application development;

2. For sensor apparatuses, services provided by particular sensor apparatuses can be sufficiently considered in managing the sensor apparatuses, thereby ensuring reliability of services; therefore, the energy management pattern based on service instances ensures flexibility and reliability while minimizing the system energy consumption, and can be conveniently transplanted to other IoT application support platforms.

Figure 3:
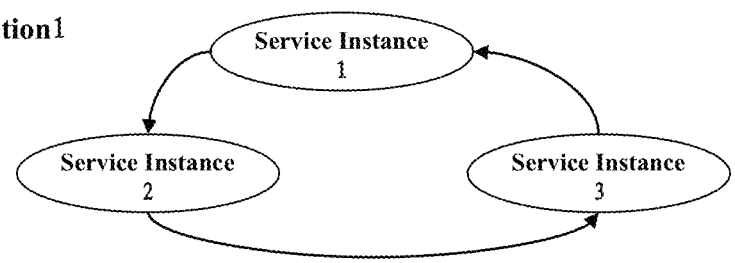
FIG. 3 illustrates the relationship between applications and service instances by a simple example.
Figure 3:
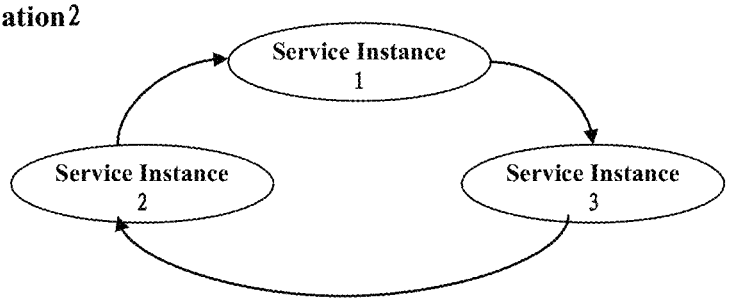
Figure 3:
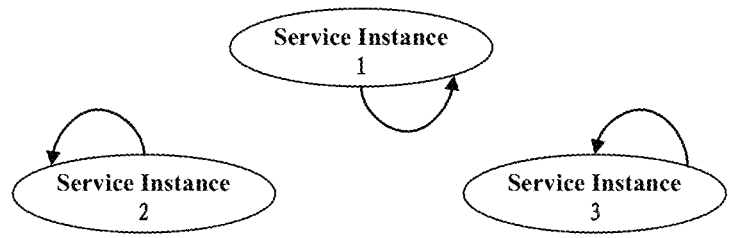

FIG. 3 illustrates the relationship between applications and service instances by a simple example. In FIG. 3, for example, service instance 1 is detecting of the temperature in room 301, service instance 2 is detecting of the humidity in room 301, and service instance 3 is the lighting in room 301. In FIG. 3, applications 1-3 use service instances 1-3 respectively to form their own application logics. With reference to the state transition in FIG. 3, for example, application 1 iteratively executes the following application logic: detecting the temperature in room 301, then detecting the humidity in room 301, and then adjusting the lighting in room 301. Application 2, for example, iteratively executes the following application logic: detecting the temperature in room 301, then adjusting the lighting in room 301, and then detecting the humidity in room 301. In application 3, the following service instances are iteratively executed, respectively: detecting the temperature in room 301, detecting the humidity in room 301as well as adjusting the lighting in room 301. FIG. 3 is only an example given for simplifying the explanation. In practice, an application may have complex application logic formed by many different service instances As for the example in FIG. 3, when a plurality of IoT applications (applications 1-3) are executed simultaneously, there is one o the following states within a certain period: one of service instances 1, 2, 3 is executed alone, service instances (1, 2) are executed, service instances (1, 3) are executed, service instances (2, 3) are executed, service instances (1, 2, 3) are executed.

Figure 4:
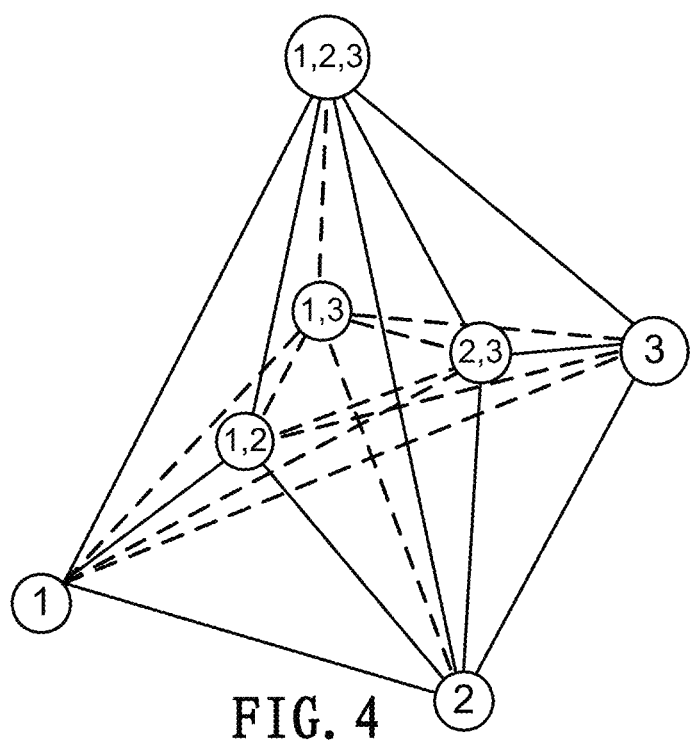
FIG. 4 illustrates a service instance state transition diagram based on the example of FIG. 3.
Figure 5:
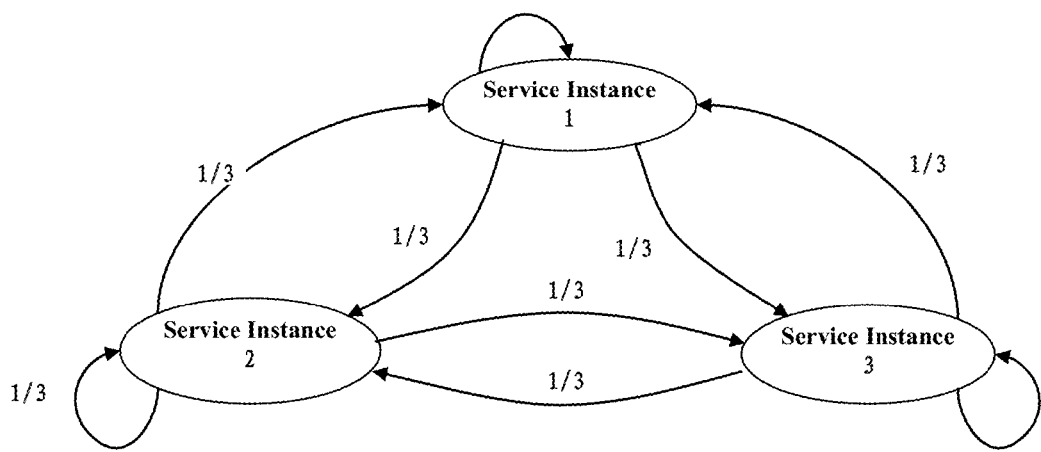
FIG. 5 illustrates a service instance state transition diagram with transition probabilities based on the example of FIG. 3.

FIG. 4 illustrates a service instance state transition diagram based on the example of FIG. 3. In FIG. 4, there are 7 states, and it is possible to transit from each state to one of the other six states. In a case where it is assumed that the probability that each of applications 1-3 appears is 1/3 and the probability that a service instance j transits to a service instance k of an application i (i=1~3) is the same, the service instance state transition diagram with transition probabilities in FIG. 5 is obtained. The service instance state transition diagram with transition probabilities is referred to as a service instance transition model in the present invention. The service instance transition model is obtained through the offline learning to the execution history of service instances, which will be described in detail later. In addition, probabilities given in FIG. 5 are only exemplary and are not limitations on the present invention.

Figure 6:
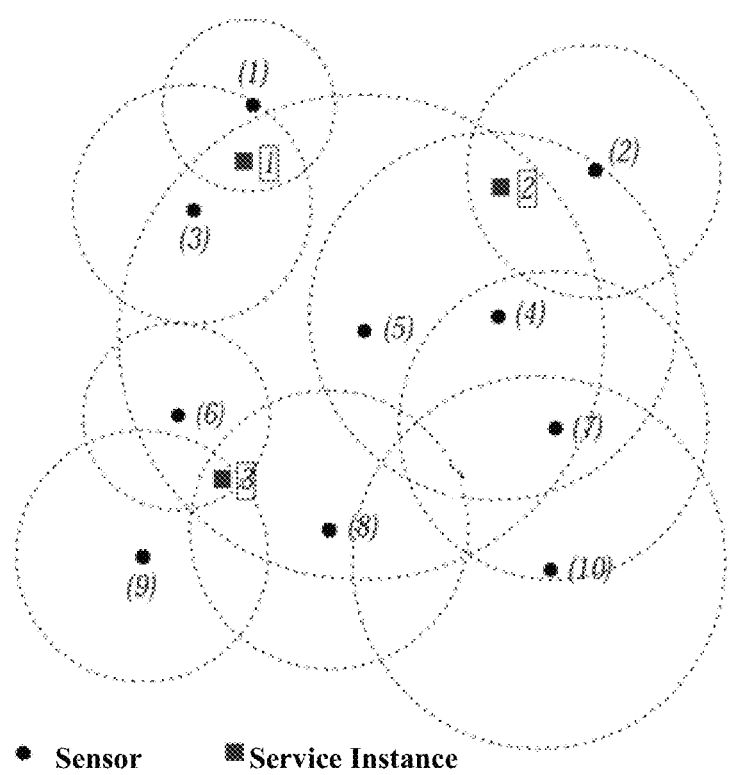
FIG. 6 is a diagram exemplifying the deployment relationship between sensors and service instances.

Below, a concept of critical covering set is introduced. A critical covering set corresponds to service instances, and it is a set of various combinations of one or more sensors that have capabilities of providing services on which the service instances are based. FIG. 6 is a diagram exemplifying the deployment relationship between sensors and service instances. In FIG. 6, 10 sensors (round dots) and 3 service instances (square dots) are shown. These sensors may be located in different domains of the IoT. It is possible to automatically generate the critical covering set in an offline state according to information of sensors and information of service instances. For example, information of sensors may include, for example, coverages (ranges) of sensors and coordinates of sensors; and information of service instances may include, for example, coordinates of service instances. Taking the service instance 1 in FIG. 6 as an example, according to information of sensors and information of service instances, it is possible to automatically generate the critical covering set $S_1=\{\{1\},\{3\},\{5\},\{1,3\},\{1,5\},\{3,5\},\{1,3,5\}\{$ of the service instance 1 in an offline state. Each combination (i.e., each element) in the critical covering set has a capability of providing services on which the service instance is based. That is, turning on sensors 1, 3 or 5 alone, as well as turning on sensors (1, 3), (1, 5), (3, 5) or (1, 3, 5) simultaneously can provide services on which the service instance 1 is based.

In addition to automatically generating critical covering sets, sometimes in consideration of other complex factors, it is also possible to set said critical covering sets manually in advance. For example, regarding the example in FIG. 6, it is possible to set various critical covering sets in advance as follows.

$S_1=\{\{1\}, \{3,5\}\}$
$S_2=\{\{2,4\}, \{2,5\}, \{4,5\}\}$
$S_3=\{\{6\}, \{5,8\}, \{8,9\}\}$
$S_{\{1,2\}}=S1\times S2$
$S_{\{2,3\}}=S2\times S3$
$S_{\{1,3\}}=S1\times S3$
$S_{\{1,2,3\}}=S1\times S2\times S3$ where $S_1$ denotes the critical covering set of the service instance i, $S_{\{1,2\}}$ denotes the critical covering set that satisfies the condition in which the service instances 1 and 2 are executed simultaneously and is equal to $S_1+S_2$, the operator "×" here denotes the Cartesian product of $S_1$ and $S_2$. For example, here, $S_{\{1,2\}}=\{\{1,2,4\}, \{1,2,5\}, \{1,4,5\}, \{2,3,4,5\}, \{2,3,5\}, \{3,4,5\}\}$. Furthermore, definitions of $S_{\{2,3\}}$, $S_{\{1,3\}}$ and $S_{\{1,2,3\}}$ are similar to that of $S_{\{1,2\}}$.

Figure 7:
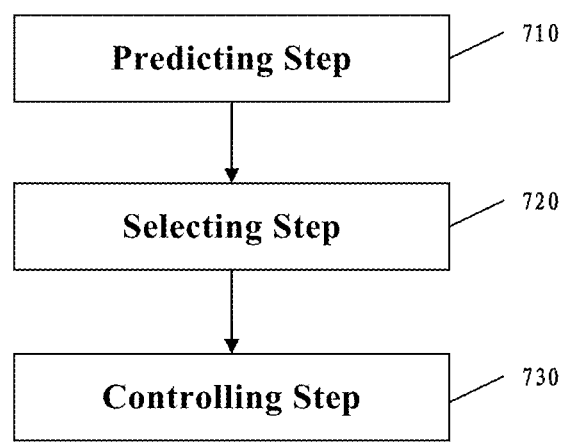
FIG. 7 is a flowchart illustrating a method for service-instance oriented energy management in the IoT according to an embodiment of the present invention.

FIG. 7 is a flowchart illustrating a method for service-instance oriented energy management in the IoT according to an embodiment of the present invention. The energy management method is executed in the IoT energy management server in the IoT application infrastructure. The IoT energy management server is used to perform centralized energy management on the whole IoT. The processing in the flowchart in FIG. 7 includes the following steps:

Step 710: predicting step.
Step 720: selecting step.
Step 730: controlling step.

In the following, each step in the energy management method of the present invention in FIG. 7 is described in detail.

Step 710: Predicting Step

In step 710, a target service instance to be serviced in a subsequent time period is predicted based on the service instance transition model.

Figure 8:
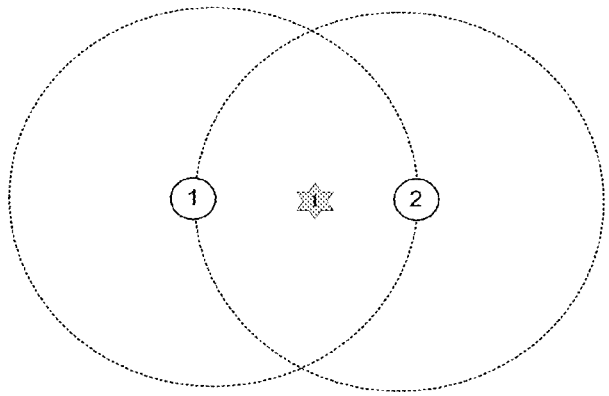
FIG. 8 is a diagram illustrating an example of the deployment relationship between sensors and service instances.

In the following, an explanation of each step in the energy management method of the present invention is made in combination with a specific simple example. FIG. 8 is a diagram illustrating an example of the deployment relationship between sensors and service instances. In FIG. 8, there are two sensors and one service instance, i.e., sensor 1, sensor 2 and service instance 1. According to the topology in FIG. 8, each of the two sensors can satisfy the execution of the service instance 1 individually.

Figure 9:
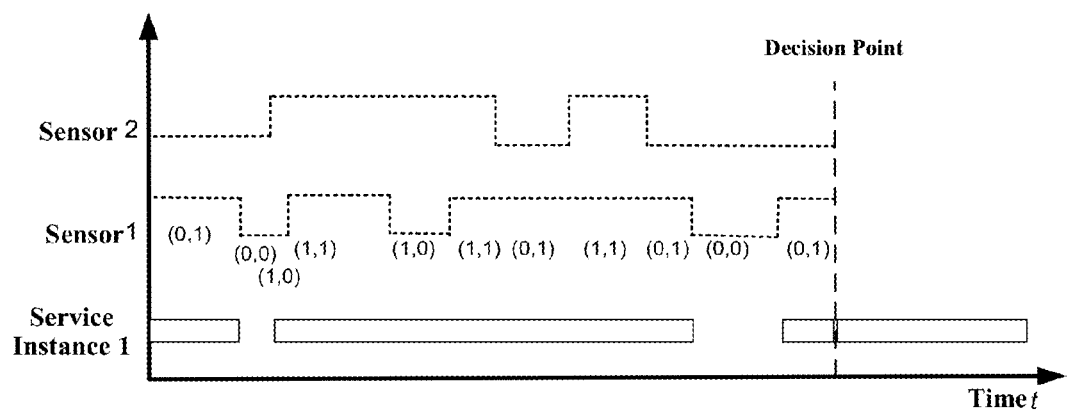
FIG. 9 is a diagram illustrating an example of the use history data of sensors and the execution history of a service instance corresponding to the example in FIG. 8.

The service instance transition model in step 710 is obtained through the offline learning to the execution history of service instances. FIG. 9 is a diagram illustrating an example of the use history data of sensors and the execution history of the service instance corresponding to the example in FIG. 8. For example, the energy management method of the present invention is executed at the decision point in FIG. 9. In the lower part in FIG. 9, the execution history of the service instance 1 is shown. According to the execution history of the service instance 1 in FIG. 9, it is possible to obtain the following statistics of the state transition of the service instance 1: it is assumed that there are 45 time units between the origin and the decision point, wherein in 33 time units the service instance is in continuous execution (i.e., the previous time unit is for execution and the subsequent time unit is also for execution), in 4 time units it is from execution to disappearance, in 4 time units it is from disappearance to execution, and in 4 time units it is in continuous disappearance.

According to the above statistics of the execution history of the service instance 1, it is possible to conclude that in the next time period (a predetermined time period starting from the decision point), the probability that the service instance 1 continues to be executed is 33/(33+4)=0.89; the probability that the service instance 1 ceases is 4/(33+4)=0.11; the probability of transiting from a non-service instance state to the execution of the service instance 1 is 4/(4+4)=0.5; the probability of maintaining the non-service instance state is 4/(4+4)=0.5. Thus, the state transition diagram shown in FIG. 11 is obtained.

Figure 11:
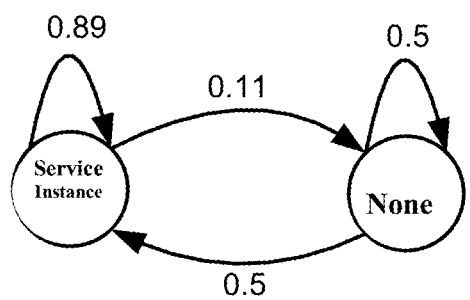
FIG. 11 illustrates a service instance state transition diagram based on the example of FIG. 9.

FIG. 11 illustrates a service instance state transition diagram based on the example of FIG. 9. The service instance state transition diagram with transition probabilities corresponds to the service instance transition model in step 710. According to the service instance transition model in FIG. 11, given that the service instance 1 is currently serviced (see FIG. 9), in step 710, the next service instance to be serviced is predicted. A random selection policy is adopted in the present invention. Here, a random number rand (rand is a random number in the range of [0, 1]) is generated and compared with the probability of transiting outwardly from the service instance 1, and we have:

If rand≤0.89, →service instance 1;
If rand>0.89, →none where "none" denotes a state in which no service instance is serviced. Thus, according to the generated random number, a service instance to be serviced in the next time period (cycle) is predicted. Given that rand=0.3, in step 710, the service instance 1 is predicted to be serviced in the next time period.

In the above, a simplest example is given only for facilitating the explanation. In fact, a plurality of service instances will be executed simultaneously in the IoT. According to the execution history of these service instances, service instance state transition diagrams similar to those in FIGS. 5 and 11 may be also obtained. The more the service instances are, the more complex the transition diagrams become.

The inventors of the present invention have proposed that energy management should be performed in a service-instance oriented way but not directly in a sensor-oriented way. Here, the reason is given with reference to FIGS. 8 and 9. Here, the ON/OFF states of sensors in FIG. 8 are defined as: ON:1; OFF:0, so that four kinds of ON/OFF states (sensor 2, sensor 1) of sensors are obtained: (0, 1), (1, 0), (1, 1), (0, 0). It is assumed that the use history data of sensors is as shown in the upper part in FIG. 9. Likewise, there are 45 time units between the origin and the decision point. And it is assumed that the measures from the drawing are: the sensor 1 is ON for a total time of 32 time units and is OFF for a total time of 13 time units; and the sensor 2 is ON for a total time of 20 time units and is OFF for a total time of 25 time units.

According to FIG. 9, the sensor ON/OFF state transition frequencies and transition probabilities are obtained as follows:

(0,0)→(0,1): once=>0.5 (1,0)→(0,1): 0 times=>0
(0,0)→(1,0): once=>0.5 (1,0)→(0,0): 0 times=>0
(0,0)→(1,1): 0 times=>0 (1,0)41,1): twice=>1
(1,1)→(0,1): twice=>0.67 (0,1)→(1,1): once=>0.33
(1,1)→(1,0): once=>0.33 (0,1)→(1,0): 0 times=>0 wherein the above transition probabilities are calculated based on the number of times of corresponding state transition. For example, state transition originating from (0, 0) happens twice, once it is transited to (0, 1) and once it is transited to (1, 0). So the corresponding transition probabilities are 0.5, respectively.

Figure 10:
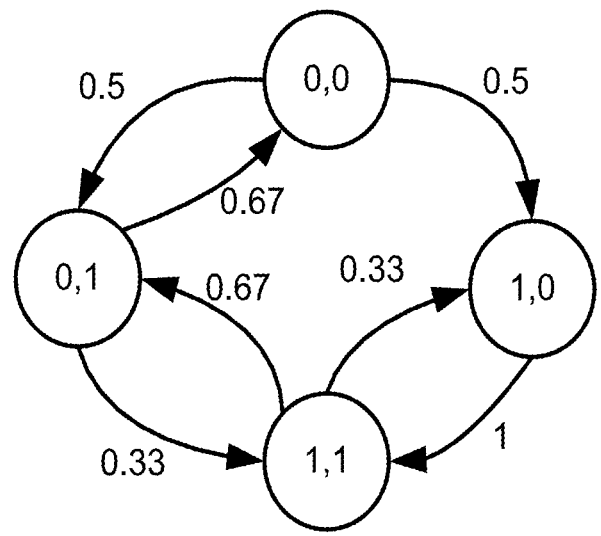
FIG. 10 illustrates a sensor ON/OFF state transition diagram based on the example of FIG. 9.

In this way, the sensor ON/OFF state transition diagram shown in FIG. 10 is obtained. As seen from FIG. 10, in the current state (0, 1), at the decision point it is most possible to transit to the state (0, 0); and in the state (0, 0), both sensors 1 and 2 will be turned off. However, on the other hand, as seen from FIG. 9, in fact, the service instance 1 is stilled executed after the decision point. Therefore, the sensor ON/OFF control performed according to the sensor ON/OFF state transition diagram will not satisfy the execution of the service instance 1 in the future, and thus the quality of service is not satisfied.

In addition, the complexity of the method based on the sensor ON/OFF state transition diagram is too high. Given that the network has N sensors and M service instances in total, the method based on the sensor ON/OFF state transition diagram has to record $2^N$ different states, each calculated state needs N bits for recording. Thereby, a total of $N2^N$ bits have to be stored. In the context of the IoT, the number N of sensors is generally in the order of millions, and this number is far beyond the storage capability of a general server, which is impractical in implementation. For example, when N=1000, $N2^N=1.3e^{303}$ bytes.

However, in the method based on the service instance transition model of the present invention, only $2^M$ different states have to be recorded, and $M2^M$ bits are to be stored. In a scenario of the IoT, the number of service instances is generally small (e.g. M=10, this is because, for example, although a kind of sensor is deployed in a factory in plenty, they execute the same task). Therefore, the calculation and storage complexity in this method is much lower than that in the method based on the sensor ON/OFF state transition diagram. For example, when M=20, $M2^M$=2.6 megabytes.

In addition, it is note that the energy management method of the present invention is executed in a real-time way. In one embodiment, the service instance transition model (e.g., in FIG. 11) is obtained through the offline learning to the execution history of service instances. Said learning is performed periodically so that said service instance transition model is updated periodically. For example, whenever the system or method of the present invention is ready to be online or at a predetermined timing or interval, on the basis of the latest execution history of service instances, a current service instance transition model is obtained through learning. Then, when executed, the system or method of the present invention uses the service instance transition model to make said prediction. In doing so, dynamic changes in the application running may be considered. For example, a service instance used by an application running in the nighttime may be quite different from a service instance used by an application running in the daytime.

Step 720: Selecting Step

In step 720, according to a critical covering set corresponding to target service instances, the use history data of sensors in the critical covering set and energy parameters of said sensors, an ON-sensor set to be turned on to provide services on which said target service instances are based is selected.

Still, the case in FIGS. 8 and 9 is taken as an example for explanation. As described above, it is assumed that according to the above algorithm, in step 710 the service instance 1 is predicted to be serviced in the next time period. The critical covering set corresponding to the service instance 1 is $S_{\{1\}}=\{\{1\},\{2\},\{1,2\}\}$. That is, sensors 1 and 2 can satisfy the service instance 1 separately or in combination with each other. The critical covering set may be automatically generated, or may be preset.

Now, in step 720, it is necessary to select which sensor or sensors is used to satisfy the service instance 1.

The use history data of sensors (sensors 1 and 2) in the critical covering set $S_{\{1\}}$ is as described above: the sensor 1 is ON for a total time of 32 time units and is OFF for a total time of 13 time units; and the sensor 2 is ON for a total time of 20 time units and is OFF for a total time of 25 time units. For example, energy parameters of a sensor include at least initial energy of the sensor, energy consumed per unit time of the sensor and energy consumed by a single ON/OFF operation of the sensor. In the example of FIGS. 8 and 9, it is assumed that there are the following sensor energy parameters:

only the sensor 1 is ON: 0.1 energy unit (E)/time unit is consumed only the sensor 2 is ON: 0.1 energy unit/time unit is consumed the initial energy of each sensor is 10E, each ON/OFF operation of the sensor consumes 0.1E energy when both sensors 1 and 2 are ON, each of them consumes 0.1 energy unit/unit time.

According to the upper part in FIG. 9, the statistics is obtained: up to the decision point, the ON/OFF operation of the sensor 1 is performed for 6 times, this consumes 0.6E energy, and the sensor 1 is ON for 32 time units, this consumes 3.2E energy, thus 10E-0.6E-3.2E=6.2E energy remains; the ON/OFF operation of the sensor 2 is performed for 4 times, this consumes 0.4E energy, and the sensor 2 is ON for 20 time units, this consumes 2.0E energy, thus 10E-0.4E-2.0E=7.6E energy remains.

In step 720, in one embodiment, said selection is based on an energy consumption rate, which is calculated according to a critical covering set corresponding to target service instances, the use history data of sensors in the critical covering set and energy parameters of said sensors, in the cases where each combination in the critical covering set is selected.

In the present invention, the energy consumption rate of each sensor is defined as:

$$r_i^t = \gamma_1 \frac{t_i^{ON}}{T} + \gamma_2 \frac{e_i}{E_i}$$

where $r_i^t$ is an energy consumption rate of the i-th sensor, $t_i^{ON}$ is a total ON time of the i-th sensor, T is a total statistical time period, $e_i$ is energy consumed by a single ON/OFF operation of the i-th sensor, $E_i$ is the remaining energy of the i-th sensor, $\gamma_1$ and $\gamma_2$ are set weight coefficients.

The energy consumption rate in case where each combination in the critical covering set is selected is:

$$r_s^t = \frac{1}{N} \sum r_i^t$$

where S denotes the critical covering set.

In one embodiment, for example, parameters are set as follows: $\gamma_{1=0.2}$ and $\gamma_{2=0.8}$. In the following, the energy consumption rate in a case where each element in the critical covering set is selected is calculated.

If, in the next time period, only the sensor 1 provides a service (corresponding to $\{1\}$ in $S_{\{1\}}$), the energy consumption rate of the sensor 1 is calculated as:

$$\begin{cases} r_1^t = 0.2\frac{32T}{45T} + 0.8\frac{0}{6.2E} = 0.142 \\ r_2^t = 0 \end{cases} \Rightarrow r_{S_{\{1\}}}^t = r_1^t = 0.142$$

wherein the current state is (0, 1), the sensor 1 is in the ON state, so it is not necessary to perform the ON/OFF operation of the sensor, thereby $e_{i=0}$; and T is the time unit. In addition, $r_{S_{\{1\}}}^t$ denotes the energy consumption rate of $S_{\{1\}}$.

If, in the next time period, only the sensor 2 provides a service (corresponding to $\{2\}$ in $S_{\{1\}}$), the energy consumption rate of the sensor 2 is calculated as:

$$\begin{cases} r_1^t = 0 \\ r_2^t = 0.2\frac{20T}{45T} + 0.8\frac{0.1E}{7.6E} = 0.0994 \end{cases} \Rightarrow r_{S_{\{1\}}}^t = r_2^t = 0.0994$$

If, in the next time period, the sensors 1 and 2 provide services in combination with each other (corresponding to $\{1, 2\}$ in $S_{\{1\}}$), the energy consumption rate of the sensors 1 and 2 is calculated as:

$$\begin{cases} r_1^t = 0.2\frac{32T}{45T} + 0.8\frac{0}{6.2E} = 0.142 \\ r_2^t = 0.2\frac{20T}{45T} + 0.8\frac{0.1E}{7.6E} = 0.0994 \end{cases} \Rightarrow r_{S_{\{1\}}}^t = \frac{1}{2}(r_1^t + r_2^t) = 0.121$$

Because based on the prediction in step 710, in order to satisfy the service instance 1, it is not possible for the sensors 1 and 2 to be OFF simultaneously, a case where the sensors 1 and 2 are OFF simultaneously is not considered.

Then, based on the energy consumption rate, an ON-sensor set to be turned on to provide services on which said target service instances are based is selected. Specifically, in the above example, three calculated energy consumption rates are compared and the sensor set corresponding to the minimum energy consumption rate is selected.

$$0.0994 \leftarrow \min \begin{cases} 0.142 \\ 0.0994 \\ 0.121 \end{cases}$$

In the current example, the element $\{2\}$ in the critical covering set $S_{\{1\}}$ is selected, i.e., the ON-sensor set is $\{2\}$. That is, in the next time period, the sensor 2 is selected to be turned on.

On the other hand, if it is assumed that no service instance is predicted to be serviced in the next time period in step 710, all the sensors are simply turned off in step 720.

The above-mentioned energy consumption rate is only an example given in the present invention. Those skilled in the art may think of other metrics used to compare various combinations of sensors (for example, energy consumed by the ON/OFF operation is not considered) so that selection of combinations of sensors to be turned on may be done as well.

Step 730: Controlling Step

In step 730, when the next time period begins, an ON/OFF control is performed on the sensors in the IoT, the sensors in the ON-sensor set are turned on and the sensors other than those in the ON-sensor set are turned off.

For example, according to the above example, in step 730, when the next time period begins (i.e., at the decision point in FIG. 9), the sensor 2 in the ON-sensor set {2} is turned on, and the sensor other than that in the sensor set {2}, i.e., the sensor 1, is turned off.

Figure 12:
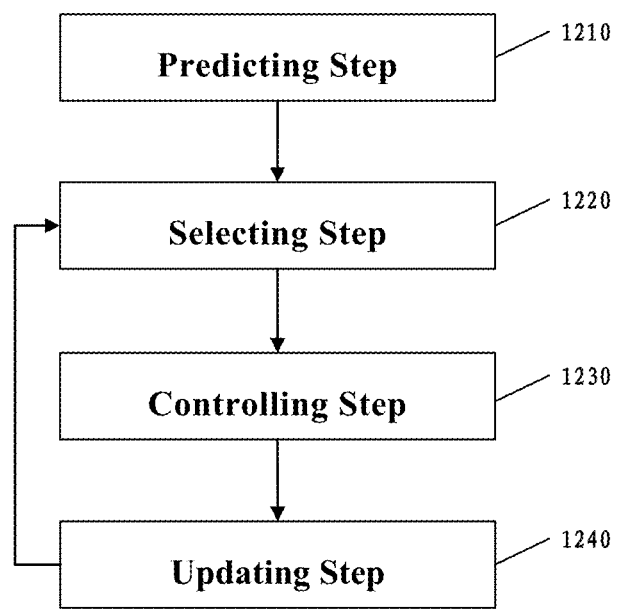
FIG. 12 is a flowchart illustrating a method for service-instance oriented energy management in the IoT according to another embodiment of the present invention.

FIG. 12 is a flowchart illustrating a method for service-instance oriented energy management in the IoT according to another embodiment of the present invention. The processing in the flowchart in FIG. 12 includes the following steps: a predicting step 1210, a selecting step 1220, a controlling step 1230 and an updating step 1240, wherein the processing in steps 1210 to 1230 is similar to that in steps 710 to 730 in FIG. 7.

In the updating step 1240, according to the usage of sensors in said next time period, the use history data of sensors is updated. That is, in a manner described in the upper part in FIG. 9, the accumulation of the use history data of sensors 1 and 2 in said next time period is continued.

After step 1240, the processing returns to step 1220, and steps 1220 to 1240 are performed periodically. From the second execution, the use history data of sensors used in step 1220 during each execution is the use history data of sensors updated in step 1240 during the last execution.

In the above, the inventive concept of the present invention is explained by a simple example. However, the present invention is not limited to the disclosed particular embodiments or particular values of parameters. For example, the above energy consumption rate may be given by other formulae, $\gamma_1$ and $\gamma_2$ may also be set to, for example, 0.3 and 0.7, etc.

Figure 13:
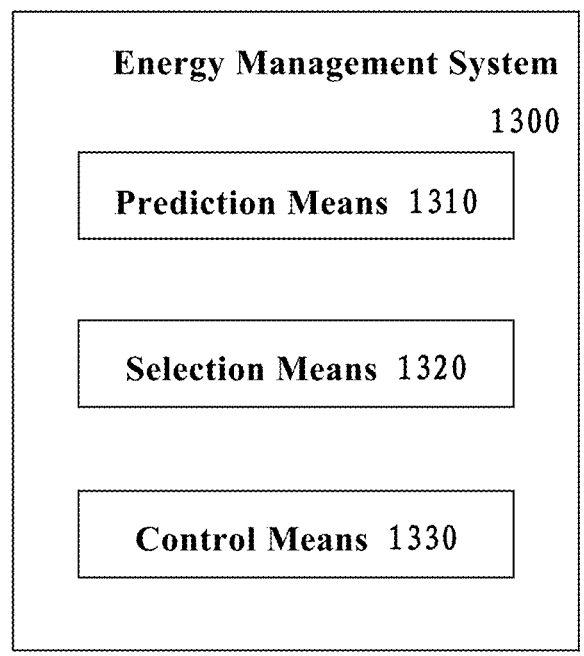
FIG. 13 illustrates a system for service-instance oriented energy management in the IoT according to the present invention.

FIG. 13 illustrates a system 1300 for service-instance oriented energy management in the IoT according to the present invention. The energy management system 1300 includes a prediction means 1310, a selection means 1320 and a control means 1330. The prediction means 1310 predicts target service instances to be serviced in a subsequent time period based on the service instance transition model. The selection means 1320 selects an ON-sensor set to be turned on to provide services on which said target service instances are based, according to a critical covering set corresponding to the target service instances, the use history data of sensors in the critical covering set and energy parameters of said sensors. The control means 1330 performs, when said next time period begins, an ON/OFF control on the sensors in the IoT, the sensors in the ON-sensor set are turned on and the sensors other than those in the ON-sensor set are turned off.

In another embodiment, the energy management system 1300 may further comprise an updating device 1340. The updating device 1340 updates the use history data of sensors according to the usage of sensors in said time period.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A service-instance oriented energy management method in the Internet of Things (IoT), comprising:
    predicting target service instances to be serviced in a subsequent time period based on a service instance transition model;
    selecting an ON-sensor set to be turned on to provide services on which said target service instances are based, wherein selectins the ON-sensor set to be turned on is based on a critical covering set corresponding to the target service instances, the use history data of sensors in the critical covering set, and energy parameters of said sensors; and
    performing an ON/OFF control on the sensors in the IoT in response to the start of said time period so that the sensors in the ON-sensor set are turned on and the sensors other than those in the ON-sensor set are turned off.

2. The energy management method according to claim 1, wherein said service instance is an instance of service that be is provided based on a combination of sensors.

3. The energy management method according to claim 2, wherein the critical covering set corresponding to service instances is a set of various combinations of one or more sensors that are capable of providing services on which the service instances are based.

4. The energy management method according to claim 1, further comprising updating the use history data of sensors according to the usage of sensors in said time period,
    wherein said selecting, said controlling, and said updating are performed periodically, and from the second execution, the use history data of sensors used in said selecting during each execution is the use history data of sensors updated in said updating during the last execution.

5. The energy management method according to claim 1, wherein the energy parameters of said sensors include at least initial energy of the sensors, energy consumed per unit time of the sensors and energy consumed by a single ON/OFF operation of the sensors.

6. The energy management method according to claim 1, wherein said selection is based on an energy consumption rate, wherein the energy consumption rate is calculated when each combination in the critical covering set is selected based on the critical covering set corresponding to the target service instances, the use history data of sensors in the critical covering set, and energy parameters of said sensors.

7. The energy management method according to claim 1, wherein said critical covering set is preset.

8. The energy management method according to claim 1, wherein said critical covering set is automatically generated in an offline state according to information of sensors and information of service instances.

9. The energy management method according to claim 1, wherein said sensors are located in different domains of the IoT.

10. The energy management method according to claim 1, wherein said service instance transition model is obtained through the offline learning to the execution history of service instances.

11. The energy management method according to claim 10, wherein said learning is performed periodically so that said service instance transition model is updated periodically.

12. A service-instance oriented energy management system in the IoT, comprising:
    a prediction means for predicting target service instances to be serviced in a subsequent time period based on a service instance transition model;
    a selection means for selecting an ON-sensor set to be turned on to provide services on which said target service instances are based, wherein selecting an ON-sensor set to be turned is based on a critical covering set corresponding to the target service instances, the use history data of sensors in the critical covering set and energy parameters of said sensors; and
    a control means for performing , an ON/OFF control on the sensors in the IoT in response to start of said time period , so that the sensors in the ON-sensor set are turned on and the sensors other than those in the ON-sensor set are turned off.

13. The energy management system according to claim 12, wherein said service instance is an instance of service that is provided based on a combination of sensors.

14. The energy management system according to claim 13, wherein the critical covering set corresponding to service instances is a set of various combinations of one or more sensors that are capable of providing services on which the service instances are based.

15. The energy management system according to claim 12, wherein the energy parameters of said sensors include at least initial energy of the sensors, energy consumed per unit time of the sensors and energy consumed by a single ON/OFF operation of the sensors.

16. The energy management system according to claim 12, wherein the selecting is based on an energy consumption rate, wherein the energy consumption rate is calculated when each combination in the critical covering set is selected according to the critical covering set corresponding to the target service instances, the use history data of sensors in the critical covering set and energy parameters of said sensors.

17. The energy management system according to claim 12, wherein said critical covering set is preset.

18. The energy management system according to claim 12, wherein said critical covering set is automatically generated in an offline state according to information of sensors and information of service instances.

19. The energy management system according to claim 12, further comprising an updating means configured to update the use history data of sensors according to the usage of sensors in said time period.

20. A non-transitory, computer readable storage medium tangibly embodying a commuter readable program code having computer readable instructions which, when implemented, cause a computer device to carry out the steps of a method comprising:

predicting target service instances to be serviced in subsequent time period based on a service instance transition model;

selecting an ON-sensor set to be turned on to provide services on which said target service instances are based, wherein selecting the ON-sensor set to be turned on is based on a critical covering set corresponding to the target service instances, the use history data of sensors in the critical covering set, and energy parameters of said sensors; and performing an ON/OFF control on the sensors in the IoT in response to the start of said time period so that the sensors in the ON-sensor set are turned on and the sensors other than those in the ON-sensor set are turned off.

\* \* \* \* \*